United States Patent [19]

Granata, Jr. et al.

[11] Patent Number: 4,978,590

[45] Date of Patent: Dec. 18, 1990

[54] DRY COMPLIANT SEAL FOR PHOSPHORIC ACID FUEL CELL

[75] Inventors: Samuel J. Granata, Jr., South Greensburg; Boyd M. Woodle, N. Huntingdon Township, Westmoreland County, both of Pa.

[73] Assignee: The United States of America as represented by the Department of Energy, Washington, D.C.

[21] Appl. No.: 405,716

[22] Filed: Sep. 11, 1989

[51] Int. Cl.$^5$ ............................................. H01M 2/08
[52] U.S. Cl. ......................................... 429/35; 429/36
[58] Field of Search ...................... 429/36, 37, 35, 38, 429/39, 185, 34

[56] References Cited

U.S. PATENT DOCUMENTS

| | | | |
|---|---|---|---|
| 4,007,059 | 2/1977 | Witherspoon et al. | 429/34 X |
| 4,187,390 | 2/1980 | Gore | 174/102 R |
| 4,374,185 | 2/1983 | Power et al. | 429/36 |
| 4,728,533 | 3/1988 | Feigenbaum et al. | 429/36 X |
| 4,728,585 | 3/1988 | Briggs | 429/36 |
| 4,732,637 | 3/1988 | Dettling et al. | 429/36 X |
| 4,738,905 | 4/1988 | Collins | 429/36 |
| 4,756,981 | 7/1988 | Breault et al. | 429/36 |

Primary Examiner—Anthony Skapars
Attorney, Agent, or Firm—Fred J. Baehr, Jr.

[57] ABSTRACT

A dry compliant overlapping seal for a phosphoric acid fuel cell preformed of non-compliant Teflon to make an anode seal frame that encircles an anode assembly, a cathode seal frame that encircles a cathode assembly and a compliant seal frame made of expanded Teflon, generally encircling a matrix assembly. Each frame has a thickness selected to accommodate various tolerances of the fuel cell elements and are either bonded to one of the other frames or to a bipolar or end plate. One of the non-compliant frames is wider than the other frames forming an overlap of the matrix over the wider seal frame, which cooperates with electrolyte permeating the matrix to form a wet seal within the fuel cell that prevents process gases from intermixing at the periphery of the fuel cell and a dry seal surrounding the cell to keep electrolyte from the periphery thereof. The frames may be made in one piece, in L-shaped portions or in strips and have an outer perimeter which registers with the outer perimeter of bipolar or end plates to form surfaces upon which flanges of pan shaped, gas manifolds can be sealed.

22 Claims, 4 Drawing Sheets

DRY COMPLIANT SEAL FOR PHOSPHORIC ACID FUEL CELL

GOVERNMENT CONTRACT

This invention was conceived or first reduced to practice in the course of, or under contract number NASA-DEN3-290 between Westinghouse Electric Corporation and the United States Government, represented by the Department of Energy.

CROSS REFERENCE TO RELATED APPLICATIONS

This application is related to a co-pending application entitled "CORROSION FREE PHOSPHORIC ACID FUEL CELL", Ser. No. 405,718, assigned to the same assignee and filed concurrently herewith.

BACKGROUND OF THE INVENTION

The invention relates to phosphoric acid fuel cells and more particularly to a dry compliant overlapping peripheral seal for such cells.

Phosphoric Acid Fuel Cells provides an environment for an electrochemical reaction between a fuel and oxidant to create electrical energy. Each fuel cell comprises an anode and a cathode assembly with a matrix disposed therebetween. While the cells may be any shape they, are normally rectangular and stacked one on top of another forming a stack of fuel cells with manifolds disposed on opposite sides of the stack for supplying fuel and oxygen to the cells and for removing spent gases from the cells. The cells are disposed between bipolar plates made of graphite with a plurality of grooves on opposite sides thereof to either supply fuel, such as hydrogen, to the anode and oxidant such as oxygen to the cathode. The anode assembly is formed by providing a layer of catalyst on a graphite backing paper. The cathode assembly is also formed by providing a catalytic layer on graphite backing paper. Between the catalytic layers of the anode and the cathode is a porous graphite layer and a silicon carbide layer, which together form the matrix. The silicon carbide layer acts as an insulator to prevent electrons from traveling from the anode assembly to the cathode assembly of the same fuel cell, thus causing an electrical short circuit. Portions of both anode and cathode assemblies and the entire matrix assembly are sufficiently porous and hydrophilic to allow the electrolyte, phosphoric acid, to permeate therethrough. The high temperature of the anode gas in the presence of the catalyst results in the ionization of the hydrogen and the release of electrons. The hydrogen ions diffuse through the electrolyte and react with the oxygen and free electrons in the catalytic layer of the cathode in the same cell. The electrons, freed from the hydrogen, flow through the conductive bipolar plate to the cathode in the next cell or to the external circuit in the case of the end cell. The end cells of the stack of cells provide the electrons for the load current connecting the anode of one end cell to the cathode of the other end cell.

U.S. Pat. No. 4,374,185 describes a stack of phosphoric acid fuel cells having irregular edges, which engage a flange surrounding pan shaped gas manifolds that incorporates seals made of Polytetrafluoroethylene, a material sufficiently compliant to compensate for the irregular edges on the faces of the stack of fuel cells to form a gas tight seal.

SUMMARY OF THE INVENTION

Among the objects of the invention may be noted the provision of dry compliant cell edge seal, which does not rely on the phosphoric acid to effectuate the seal, the provision of an edge seal, which is easy to fabricate and install in the fuel cells and the provision of seal alignment to the edges of the bipolar plates to facilitate better manifold sealing along the faces of the stack of fuel cells. Another object is to distribute the fuel cell compression forces between the fuel cell and the edge seals at the beginning of the fuel cell life. There must be sufficient force to provide adequate electrical contact between the cell and graphite plate and sufficient force to ensure proper seal functions by compressing the compliant layer.

In general, a dry compliant cell edge seal for a fuel cell, when made in accordance with this invention, has an anode assembly, a cathode assembly, and a matrix assembly disposed between conductive graphite plates, and comprises a first generally impermeable seal strip encircling one of the anode or cathode assemblies and a second generally impermeable seal strip encircling the other of the anode or cathode assemblies. The first seal strip is wider than the second seal strip and a compliant seal strip is bonded to one of the seal strips. The seal strips are generally sized to fit the perimeter of the conductive graphite plates and are disposed between said plates to form a dry seal adjacent the margins of the fuel cell, which facilitates assembly of gas manifolds on the faces of a stack of fuel cells.

BRIEF DESCRIPTION OF THE DRAWINGS

The invention as set forth in the claims will become more apparent by reading the following detailed description in conjunction with the accompanying drawings, wherein like reference numerals refer to like parts through the drawings and in which:

DESCRIPTION OF THE PREFERRED EMBODIMENT

Figure 1:
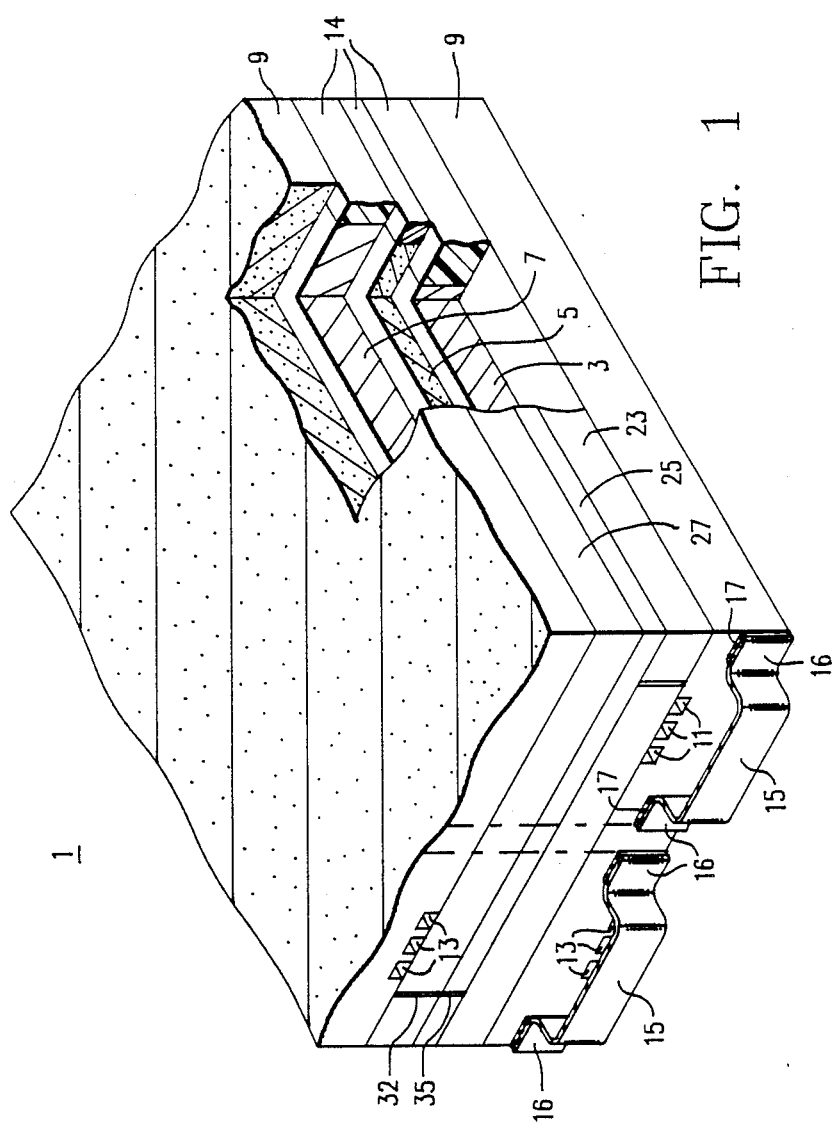
FIG. 1 is an isometric view partially in section of a fuel cell having a dry seal made in accordance with this invention.

Referring now to the drawings in detail and in particular to FIG. 1 there is shown a portion of phosphoric acid fuel cell 1, which is disposed in a stack of fuel cells (not shown). The fuel cell 1 comprises an anode assembly 3, a matrix assembly 5, and a cathode assembly 7, disposed between a pair of conductive bipolar plates 9 or between a conductive bipolar plate 9 and a conductive end plate (not shown). The bipolar plates 9 are made of graphite and have grooves 11 and 13, which supply gaseous fuel and oxygen to the fuel cell or remove spent gases therefrom. Also disposed between the bipolar plates 9 is a cell edge seal 14 encircling the components of the cell 1. The cell edge seal 14 serves to contain the supplied gases within the cell and prevent intermixing of these gases at the periphery of the cell. Pan shaped manifolds 15 with peripheral flanges 16 cover the ends of the grooves 11 and 13 on opposite sides and ends of the fuel cell; supply the fuel, a hydrogen rich gas, and oxygen, from the air, to the fuel cell 1 and remove spent gases therefrom. A gasket 17 is disposed between the manifold flanges 16 and the fuel cell 1 to prevent the gases from escaping. One of the problems is that the fuel cell is made up of stacks of anodes 3, cathodes 7, matrices 5 and bipolar plates 9 and end plates to which the manifolds 15 must be fitted and sealed. This seal must be sufficient to prevent the leakage of hydrogen which is difficult to contain and presents an explosion hazard, if it leaks into the atmosphere. Therefore, it is necessary that the sealing surface presented to the gasket 17 by the polar plates and cell edge seal 14 be as smooth as possible.

The dry cell seal 14 prevents the electrolyte, phosphoric acid, from reaching the outer margins or periphery of the fuel cells 1, and is disposed to encircle the fuel cell 1 and form a seal between the bipolar plates 9. The dry cell seal 14 comprises a first generally impermeable seal strip or frame 23 encircling the anode assembly 3, a second generally impermeable seal strip or frame 25 encircling the cathode assembly 7 and a generally impermeable compliant seal strip 27 generally encircling the matrix assembly 5 and bonded to the second seal strip 25. The first seal strip 23 is wider than the second seal strip 25 and the compliant seal strip 27. The seal strips 23 and 25 are continuous forming a picture frame like structure with an outer perimeter, which registers or matches the outer perimeter of the bipolar plates 9. The compliant seal strip member 27 is made of individual strips of expanded Teflon, since the expanded Teflon is not readily available in sizes necessary to make a frame like seal. Like the fuel cell components or elements 3, 5 and 7 the seal strips 23, 25 and 27 stack one upon another between the bipolar plates 9 forming a dry seal at the outer periphery of the fuel cell 1. Making the first seal strip 23 wider than the other two seal strips 25 and 27 allows the matrix assembly 5 to overlap the first seal strip and this overlap in cooperation with the electrolyte, phosphoric acid, which permeates a portion of the cathode assembly 7 and the matrix 5 forms a wet seal between the anode 3 and cathode 7 just inside the peripheral dry portion of the seal strips 23, 25 and 27, which prevents the electrolyte from reaching the outer periphery of the fuel cell 1.

The seal strips 23, 25 and 27 are made of Teflon or other material resistant to the acid and are sufficiently compliant to form a seal. While the first and second strips 23 and 25 are made of Teflon they are not considered compliant. The compliant seal strip 27 is formed of expanded Teflon, which is much more compliant than the other two strips 23 and 25 making the three seal strips 23, 25 and 27 sufficiently compliant as a whole to form a good seal. The thickness of all three seal strips 23, 25 and 27 are selected to compensate for the variations in thickness of the fuel cell elements, the anode, cathode and matrix assemblies 3, 7 and 5, due to manufacturing tolerances and the build up of the tolerances as assembled, and to properly distribute the required compressive loads between the fuel cell elements 3,5, and 7 and the dry compliant overlapping cell edge seal 14 upon commencement of the use of the fuel cell 1.

Figure 2:
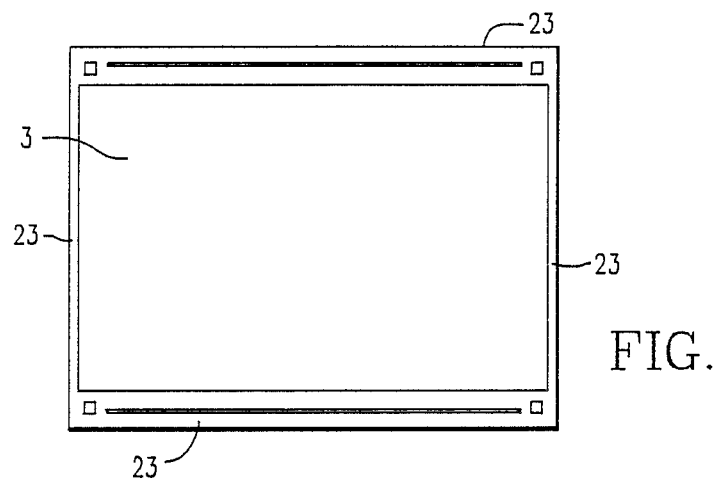
FIG. 2 is a plan view of one of the seal portions of the dry seal.
Figure 3:
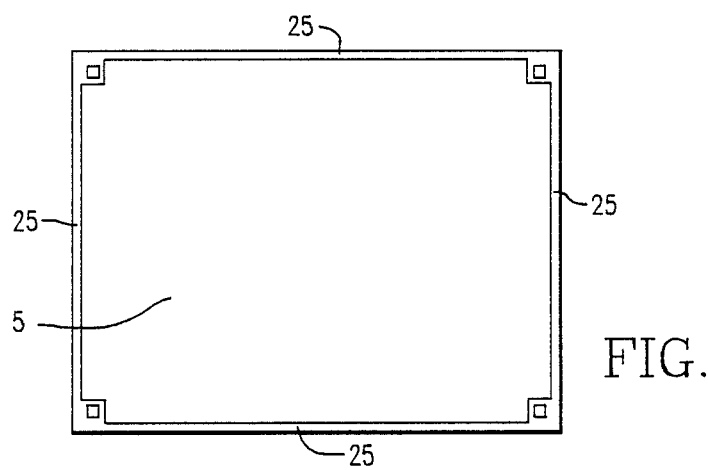
FIG. 3 is a plan view of another seal portion of the dry seal.
Figure 4:
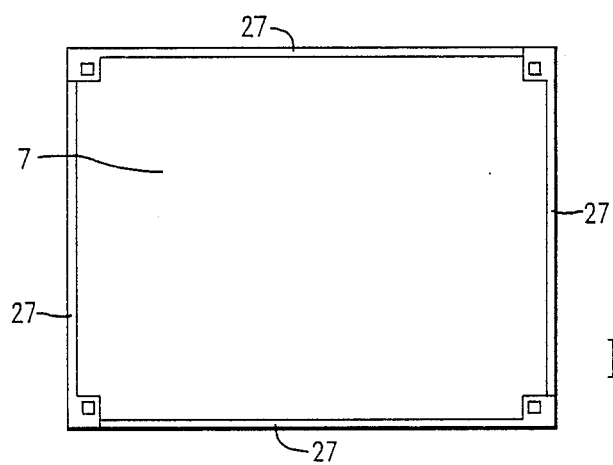
FIG. 4 is a plan view of a compliant seal portion of the dry seal.

Picture frame type dry seals, shown in FIGS. 2 and 3, offer the advantage of no peripheral junctures, and no edge seal trimming, however, they are expensive to make. Straight strips may be used as shown in FIG. 4, but straight strips require four junctures, which would result in some leakage problems unless the material is very pliable.

Figure 5:
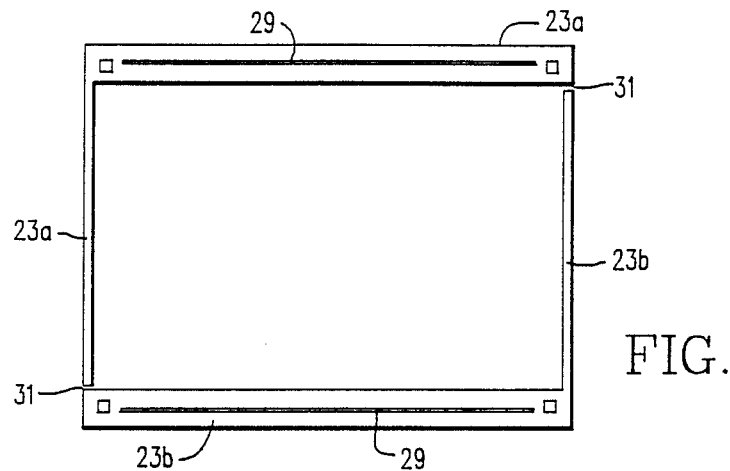
FIGS. 5, 6 and 7 are plan views of alternative embodiments of the seal portions shown, respectively, in FIGS. 2, 3 and 4.

FIG. 5, shows a first pair of L-shaped strips 23a and 23b disposed to encircle the anode assembly 3 in such a manner that there are only two junctures 31. The L-shaped strips 23a and b are so disposed that one distal end of each L-shaped strip 23a and 23b forming the pair is positioned adjacent the inner side of the other distal end of the L-shaped seal strips 23a and 23b forming the pair so that junctures 31 of the pair are on opposite sides of the fuel cell 1 and adjacent diagonally opposite corners of the fuel cell 1. The juncture 31 provides a space, which is increased or decreased to allow for manufacturing tolerances between the L-shaped seal strips 23a and b and the bipolar plates 9 and allow the outer perimeter of the L-shaped seal strips 23a and b to register with or fit closely to the outer perimeter of the bipolar plates 9 in order to produce a nearly smooth sealing surface upon which flanges 16 of the pan shaped manifolds 15 can be sealed without the need of trimming the edges of the dry compliant seals 23a and b flush with the edge of the plate 9. The juncture 31 is also positioned so it is in fluid communication with the hydrogen or fuel manifolds 15. Since fuel gas is supplied to the anode 3, which is encircled by the L-shaped seal strips 23a and b, the junctures 31 are placed in fluid communication with the manifold 15 handling the fuel so that any leakage will be in or out of the manifold handling the same gas. Because of leakage considerations between the anode and the cathode, junctures 31 are filled with caulk. The legs of the L-shaped strips 23a and b are asymmetrical with one leg being wider and longer than the other. The wider legs have a plurality of rectangular shaped slotted openings 29 extending lengthwise therein and adapted to receive an electrolyte wick (not shown).

Figure 6:
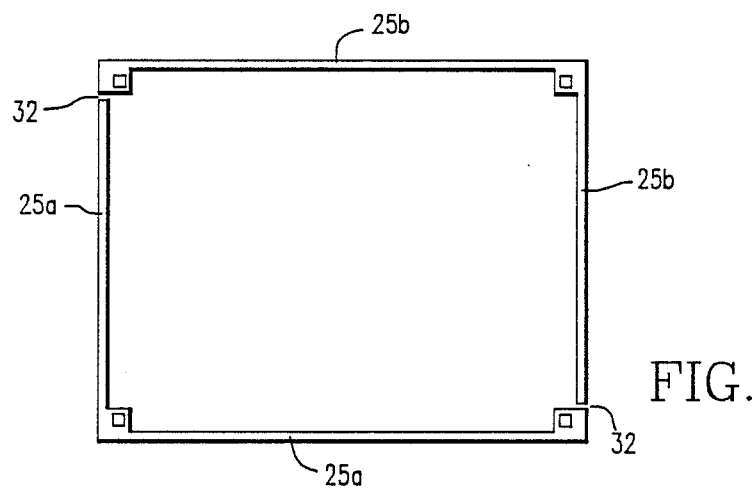

FIG. 6 shows a second pair of L-shaped strips 25a and b similar to the L-shaped strips 23a and b, but not as wide and having junctures 32 disposed adjacent opposite corners on the same sides of the fuel cell 1 as the L-shaped strips 23a and b so the junctures 32 are in communication with the manifolds 15, which handle the air or oxygen. There are also gaps at the junctures 32, which are the result of peripheral registration between the L-shaped seal strips 25a and b and the bipolar plates 9 and the magnitude of which are determined by manufacturing tolerances in the fuel cell elements. The legs of the L-shaped strips 25a and b are asymmetrical and are generally of the same width except that the longer leg has a wider portion at each end.

Figure 7:
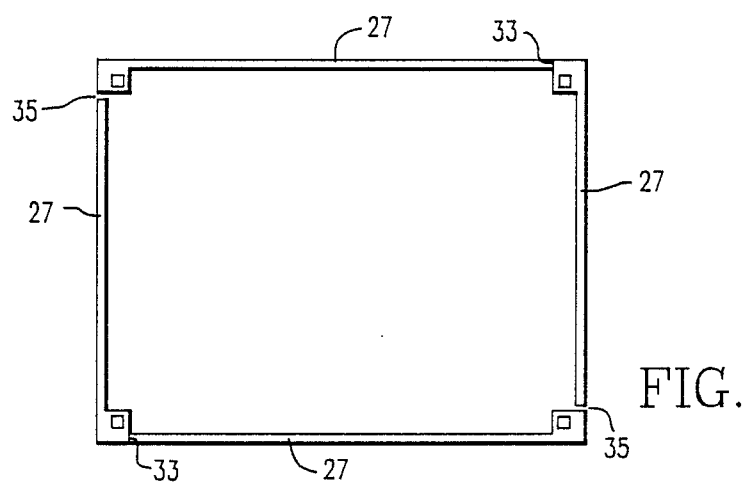

FIG. 7 shows compliant strips 27, which are preferably not L-shaped strips as the compliant strips are quite pliable and difficult to handle and for this reason are bonded to one of the pairs of L-shaped strips, preferably the second pair, 25a and b as they are essentially the same dimensions. The expanded Teflon material of the compliant strips 27 are bonded to the Teflon material of the L-shaped strips 25a and b before they are cut to size in the same operation. The strips 27 have junctures 33 and 35. Junctures 35 or like junctures and junctures 33 are abutted and closed during assembly.

Figure 8:
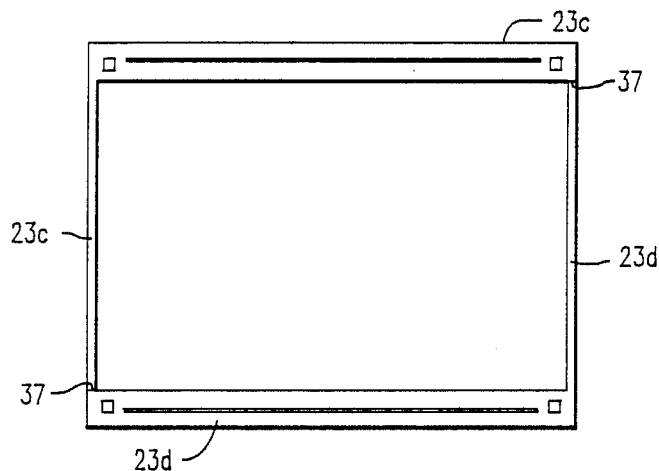
FIGS. 8, 9 and 10 are plan views of alternative embodiments of the seal portions shown, respectively, in FIGS. 5, 6 and 7.

FIG. 8 shows L-shaped seal strips 23c and d, so disposed that junctures 37 abut and there is essentially no clearance therebetween However, the legs of the L- shaped seal strips are made longer than required and the periphery of the L-shaped seal strips 23c and d are slightly larger than the periphery of the bipolar plates 9 so that when assembled with the bipolar plates 9 the seal strips 23c and d can be trimmed to make the outer perimeters register or match the outer perimeter of the bipolar plates 9 and to make the junctures 37 abut essentially without clearance.

Figure 9:
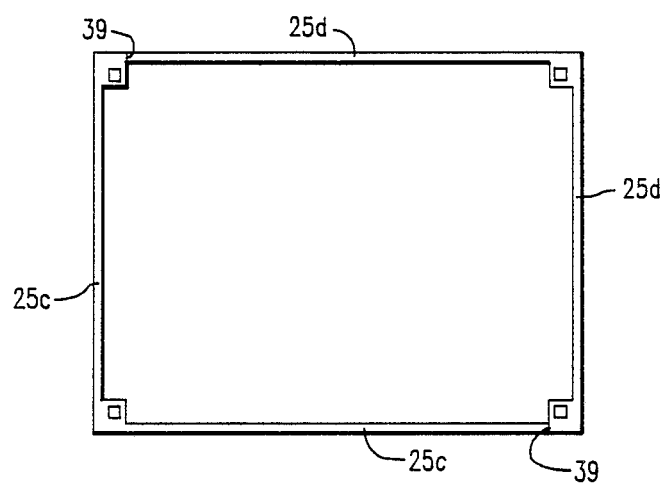

L-shaped strips 25c and d, as shown in FIG. 9, are also made so that junctures 39 abut when the L-shaped seal strips 25c and d are assembled in the fuel cell 1, overlap the outer perimeter of the bipolar plate 9 and are trimmed flush with the bipolar plates 9 during the assembly to register with the outer perimeter of the bipolar plates 9.

Figure 10:
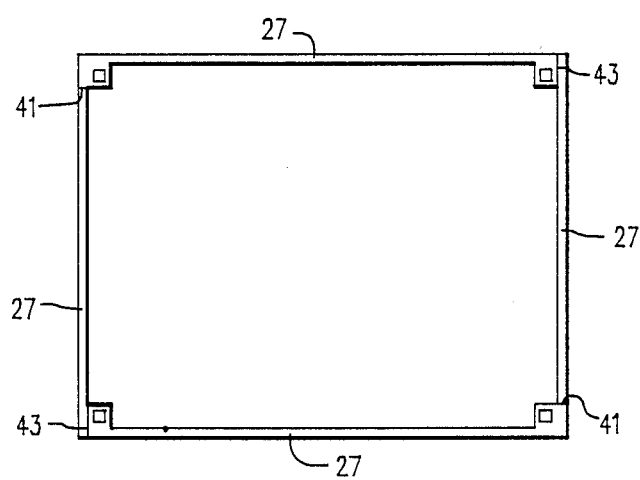

The strips 27, shown in FIG. 10, are mounted so that the ends abut and they are aligned to the inside edges of the L-shaped strips 25c and d, they are then bonded thereto and trimmed to fit the periphery of the L-shaped strips 25c and d. To facilitate handling of the pliable compliant strips 27, the expanded Teflon material is bonded to a heavy support paper (not shown) and the compliant strips are cut to size along with the support paper. After the compliant strips 27 have been bonded to the L shape strips 25c and d and trimmed, the support paper is removed. Junctures 41 and 43 are also made to abut with essentially no clearance.

The dry seals 14, hereinbefore described, advantageously seal the electrolyte inboard of the periphery of the fuel cell 1 so that no electrolyte reaches the periphery and provides a compliant dry seal 14, the thickness of which is selected to accommodate various tolerances in the fuel cell elements and to properly distribute the compressive forces between the dry seal 14 and the fuel cell elements contained therein.

While the preferred embodiments described herein set forth the best mode to practice this invention presently contemplated by the inventor, numerous modifications and adaptations of this invention will be apparent to others skilled in the art. Therefore, the embodiments are to be considered as illustrative and exemplary and it is understood that numerous modifications and adaptations of the invention as described in the claims will be apparent to those skilled in the art. Thus, the claims are intended to cover such modifications and adaptations as they are considered to be within the spirit and scope of this invention.

What is claimed is:

1. A dry seal for a fuel cell having an anode assembly, a cathode assembly, and a matrix assembly disposed between two conductive plates, said dry seal comprising a first generally impermeable seal strip encircling one of the anode and cathode assemblies; a second generally impermeable seal strip encircling the other of the anode and cathode assemblies; said first seal strip being wider than the second seal strip; a compliant seal strip bonded to one of said seal strips; said seal strips being generally sized to fit the perimeter of the conductive plates; and being disposed between said conductive plates to form a dry seal adjacent the margins to keep electrolyte from the peripheral edges of the fuel cell and to provide smooth exterior sealing surfaces.

2. A dry seal set forth in claim 1, wherein the seal strips are continuous forming a frame, which has an outer perimeter that registers with the outer perimeter of the conductive plates and the anode assembly, cathode assembly and matrix assembly each fit within one of the seal strips.

3. A dry seal as set forth in claim 1, wherein the matrix is absorbent, so as to become permeated with electrolyte, overlaps the first seal strip and the overlap and electrolyte cooperate to form a peripheral wet seal between the first seal strip and one of the anode and cathode assemblies to prevent intermixing of the fuel and oxidant gases at the periphery of the anode and cathode assemblies.

4. A dry seal as set forth in claim 1, wherein the seals are each made up of four legs, wherein opposite legs are generally symmetrical.

5. A dry seal as set forth in claim 1, wherein the first and second seal strips are formed from Teflon and the compliant strip is formed from expanded Teflon which is substantially more compliant than the Teflon forming the other seal strips.

6. A dry seal as set forth in claim 1, wherein the first seal strip comprises a pair of L-shaped generally impermeable seal strips; the second seal strip comprises a second pair of L-shaped generally impermeable seal strips; the compliant seal strip comprises compliant seal strips bonded to the second pair of L-shaped seal strips; and the first seal strip being wider than the second and the compliant seal strips.

7. A dry seal as set forth in claim 6, wherein the L-shaped seal strips are asymmetrical.

8. A dry seal as set forth in claim 6, wherein the L-shaped strips are so disposed that one distal end of each L-shaped strip in each pair is positioned adjacent the inner side of the other distal end of the seal strip forming the pair so that the junctures of the pair are on opposite sides of the fuel cell and adjacent diagonally opposite corners of the fuel cell.

9. A dry seal as set forth in claim 8, wherein the junctures of the first pair of sealing strips are on different corners of the fuel cell than the junctures of the second pair of seal strips and the compliant seal strips.

10. A dry seal as set forth in claim 6, wherein the anode assembly is disposed within the first pair of seal strips and the matrix and cathode assemblies are disposed within the second pair of seal strips and the compliant seal strips.

11. A dry seal as set forth in claim 8, wherein the pairs of seal strips when disposed in the fuel cell have an outer perimeter slightly larger than the outer perimeter of the conductive plates, whereby the seal strips in each pair abut and the seal strips are trimmed flush with the outer perimeter of the conductive plates.

12. A dry seal as set forth in claim 8, wherein the pairs of seal strips when disposed in the fuel cell have an outer perimeter which registers with the outer perimeter of the conductive plates and there is a small gap at the juncture of the seal strips in each pair the width of the gap varying in accordance with the manufacturing tolerances of conductive plates and the seal strips.

13. A dry seal as set forth in claim 8 and further comprising a pair of oxidant air manifolds disposed on opposite sides of the fuel cell adjacent diagonally opposite corners thereof.

14. A dry seal as set forth in claim 8, wherein the junctures of the pairs of seal strips when disposed in the fuel cell have an outer perimeter which has been trimmed to register with the outer perimeter of the conductive plates and the seal strips abut at the junctures thereof.

15. A dry seal as set forth in claim 8 and further comprising a pair of fuel manifolds disposed on opposite sides of the fuel cell adjacent diagonally opposite corners thereof and the junctures of the pair of seal strips encircling the anode are disposed to be in contact with said fuel manifolds.

16. A dry seal as set forth in claim 8, wherein the first and second seal strips are made of Teflon and the compliant strip is formed from expanded Teflon which is substantially more compliant than the Teflon forming the other seal strips.

17. A dry seal as set forth in claim 6, wherein the second strip has two legs, an enlarged portion where the legs come together and an enlarged portion on the distal end of one of the legs.

18. A dry seal as set forth in claim 17, wherein each enlarged portion has a hole extending therethrough.

19. A dry seal as set forth in claim 17, wherein one of the legs of the first seal strip is wider than the other and the wider leg has a plurality of individual slotted openings which extend lengthwise therein.

20. A dry seal as set forth in claim 6, wherein one of the legs of the first seal strip is wider than the other and the wider leg has a plurality of individual slotted openings which extend lengthwise therein.

21. A dry seal as set forth in claim 5, wherein each strip has a thickness which is selected to accommodate the combined tolerances in the thickness of the elements making up the fuel cell and to properly distribute the compressive forces between the seal and the fuel cell elements when assembled in a fuel cell stack and wherein the compression forces on the seal must be sufficient to resist any and all lateral pressure differentials across the width of the cell without displacing the seal from its peripheral location on the conductive plate.

22. A dry seal as set forth in claim 1, wherein the first and second seal strips are bonded to the conductive plate to which they are adjacent to facilitate assembly of the fuel cell.

* * * * *